United States Patent [19]

Müller

[11] Patent Number: 4,583,416
[45] Date of Patent: Apr. 22, 1986

[54] LUBRICATION ARRANGEMENT FOR A SPEED-REDUCTION GEAR FOR AN AIRCRAFT ENGINE

[75] Inventor: Robert Müller, Weissach, Fed. Rep. of Germany

[73] Assignee: Ing. h.c.F. Porsche A.G., Fed. Rep. of Germany

[21] Appl. No.: 495,418

[22] Filed: May 17, 1983

[30] Foreign Application Priority Data

May 18, 1982 [DE] Fed. Rep. of Germany ....... 3218661

[51] Int. Cl.⁴ .............................................. F16H 57/04
[52] U.S. Cl. ........................................ 74/467; 184/6.2; 123/196 CP; 137/899.2
[58] Field of Search ........................ 74/467, 468, 606 R, 74/606 A; 184/6.12, 6.2, 103; 123/197 C, 41.8 G, 196 CP, 198 P; 244/135 R; 137/38, 899.2

[56] References Cited

U.S. PATENT DOCUMENTS

| | | | |
|---|---|---|---|
| 990,824 | 4/1911 | Viratelle | 123/196 CP |
| 1,286,345 | 12/1918 | Kirkham | 184/6.2 |
| 1,972,962 | 9/1934 | Weber | 184/103 R |
| 3,601,515 | 8/1971 | Pellizzoni | 184/6.12 X |
| 4,117,907 | 10/1978 | Lechler | 184/6.2 |

*Primary Examiner*—Leslie A. Braun
*Assistant Examiner*—Shirish Desai
*Attorney, Agent, or Firm*—Craig & Burns

[57] ABSTRACT

A speed-reduction transmission for a reciprocating piston aircraft engine, in which the oil-collecting space of the speed-reduction transmission housing arranged between the piston engine and the propeller is connected with the oil-collecting space of the crankcase of the engine by way of an overflow pipe; the upper part of the speed-reduction transmission housing is in communication with the air space of the crankcase by way of a vent pipe; the vent pipe and the overflow pipe are so arranged that their functions are interchanged during upside-down flights of the aircraft and the oil volume disposed in the bottom of the transmission housing remains constant.

10 Claims, 3 Drawing Figures

LUBRICATION ARRANGEMENT FOR A SPEED-REDUCTION GEAR FOR AN AIRCRAFT ENGINE

The present invention relates to a speed-reduction gear for a reciprocating piston aircraft engine with an oil-collecting space formed in the lower part of the transmission housing which is connected with the oil-collecting space of the engine crankcase by way of an overflow channel.

The engine rotational speed is reduced to the propeller rotational speed by means of a speed-reduction gear, as is disclosed in the German Pat. No. 468,546. A relatively low rotational speed of the aircraft propeller is desirable in order to obtain a good propeller efficiency and to keep low the propeller noise. The functioning reliability and safety of the speed-reduction gear arranged between the engine crankshaft and the propeller shaft depends decisively upon the existence of sufficient oil lubrication of the transmission bearings and of the gears which must be assured under all possible flight conditions. If an oil-sump lubrication is used, care must be taken that a certain oil volume is also present in the lower part of the transmission housing during steeply inclined flights and upside-down flights, in order to be able to maintain lubrication by immersion of the rotating transmission gears.

Accordingly, it is a principal object of the present invention to so constructively arrange the lubrication system for a speed-reduction gear for an airplane engine that the oil level in the lower part of the transmission remains approximately constant during all flight maneuvers, especially during change from normal to upside-down flight.

The underlying problems are solved according to the present invention by a venting channel interconnecting the upper part of the transmission housing with the air space of the crankcase. During upside-down flights, the transmission housing and therewith also the horizontal venting channel arranged in the upper part of the transmission housing is pivoted through 180° and serves in this position as an overflow channel while the overflow channel assumes the function of a venting channel to the crankcase.

According to an advantageous embodiment of the present invention, the venting channel and overflow channel are so arranged that the oil filling level volume which remains in the bottom of the transmission housing during a change from one to another flight condition, has in each case the same level. An opposed cylinder-type engine is preferably used as the aircraft engine, whose oppositely disposed cylinder rows are disposed horizontally in the aircraft during normal as well as upside-down flight. The oil-collecting space of the crankcase is laid out symmetrically to the horizontal in the downward and upward direction so that identical filling-level volumes and therewith the same lubricating behavior results during 180°-rotation thereof about the aircraft longitudinal axis.

These and other objects, features and advantages of the present invention will become more apparent from the following description when taken in connection with the accompanying drawing which shows, for purposes of illustration only, one embodiment in accordance with the present invention, and wherein.

Figure 1:
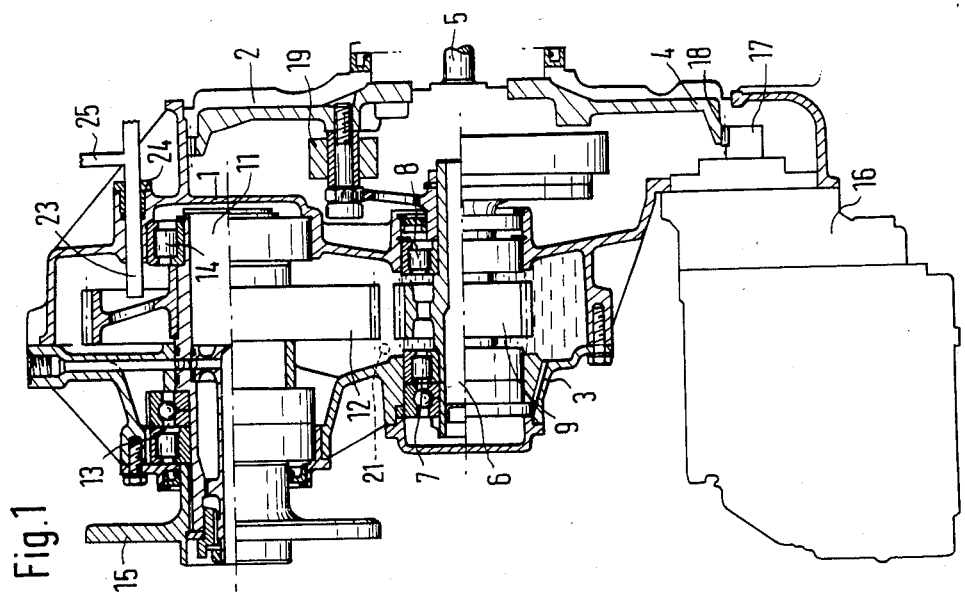
FIG. 1 is a cross-sectional view through a speed-reduction gear of an aircraft piston engine in accordance with the present invention.
Figure 2:
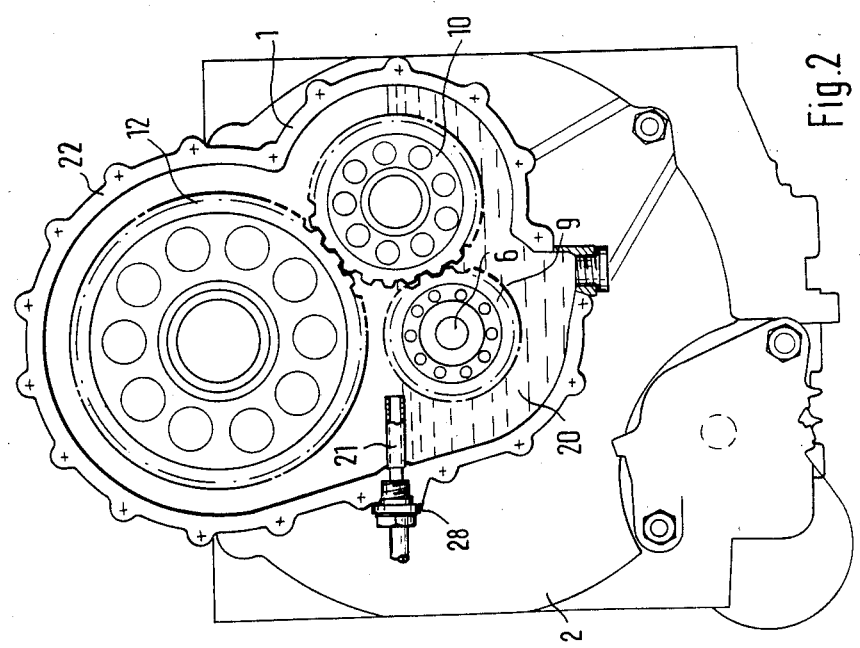
FIG. 2 is a side elevational view of the speed-reduction gear of FIG. 1 with a removed cover of the transmission housing.

Referring now to the drawing wherein like reference numerals are used throughout the various views to designate like parts, the transmission housing 1 of the speed-reduction gear is connected with the end wall 2 of the crankcase C of engine E and is closed off by a screwed-on housing cover 3. The input shaft 6 driven by the flywheel 4 of the crankshaft 5 is supported in the lower area of the transmission housing 1. A gear 9 is secured on the input shaft 6 intermediate the bearings 7 and 8, which drives the gear 12 secured on the output shaft 11 by way of an intermediate gear 10. A flange 15 arranged outside of the transmission housing 1 is secured on the output shaft 11 supported in the transmission housing 1 on both sides by means of the bearings 13 and 14; the flange 15 serves for the drive of a propeller (not shown) of the aircraft. A starter 16 is mounted on the transmission housing 1 in the lower part thereof, whose pinion 17 cooperates with the gear 18 of the flywheel 4. In order to reduce the reciprocal vibration influence of the reciprocating piston engine and of the propeller, a torsional vibration damper 19 is installed between the flywheel and the input shaft 6 of the transmission.

An oil-collecting space 20 is formed in the lower area of the transmission housing 1, whose filling level F extends up to an overflow pipe 21 which is connected to an oil-collecting space 26 of the crankcase C. A vent pipe 23 inserted into the upper part 22 of the transmission housing 1 in parallel with the output shaft 11, terminates in the air space 27 of the crankcase C. The vent pipe 23 and the overflow pipe 21 are retained and sealed off by threaded bushing, 28, respectively, screwed into the transmission housing and may have the same pipe cross sections. A branch line 25 is connected to the vent pipe 23, which is in communication with the leakage oil line of a hydraulic propeller governor G. The transmission oil which has possibly escaped at any non-tight bearing places, is replaced by way of the branch line 25 so that the oil-collecting space 20 is always filled to the level of the overflow pipe 21.

Figure 3:
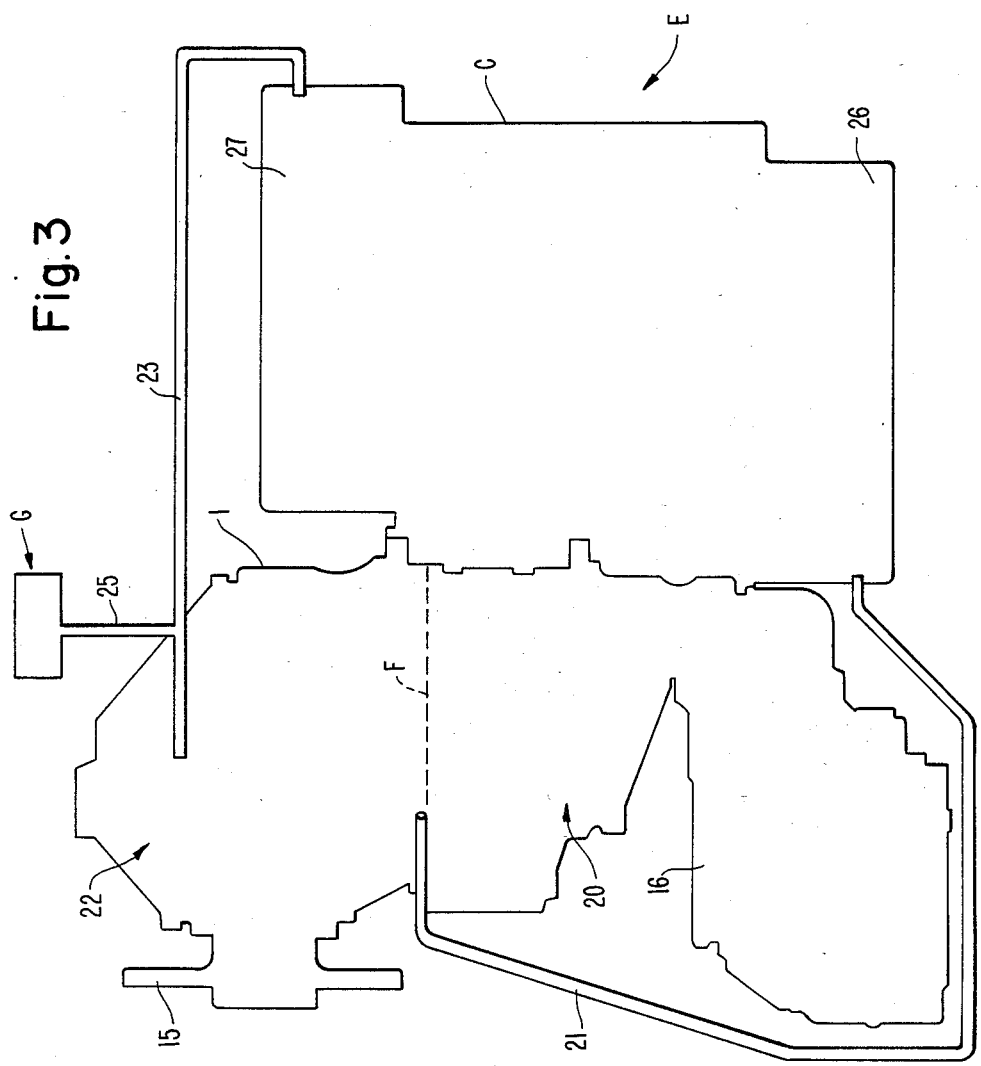
FIG. 3 is a schematic view showing the general arrangement of the interconnection of the transmission and crankcase of the engine in accordance with the present invention.

As is readily apparent from the schematic drawing of FIG. 3, the respective spaces 22, 27 of the transmission and engine will become oil-collecting areas and the respective oil-collecting spaces 20, 26 of the transmission and engine will become air spaces when the engine-transmission unit is inverted. It is the arrangement and the manner in which overflow pipe 21 and the vent pipe 23 interconnect the crankcase and transmission, as discussed above, which assures that the transmission will always have a predetermined amount of lubricant contained therein and be vented to the crankcase regardless of whether or not the engine and transmission unit are being operated in an inverted condition.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A lubrication arrangement for a reduction gear for a reciprocating piston engine in an aircraft, comprising a transmission housing means, an oil-collecting space means formed in the lower part of the transmission housing means, an engine crankcase means with an oil-collecting space means, an overflow channel means connecting the oil-collecting space means of the transmission housing means with the oil-collecting space means of the engine crankcase means, and a vent channel means initiating in an upper part of the transmission housing means and terminating in an air space of the crankcase means, the vent channel means and the overflow channel means being dimensioned and arranged relative to one another, the transmission housing means, and the engine crankcase means in a manner such that their functions are mutually interchangeable during upside-down flights of the aircraft.

2. A lubrication arrangement for a reduction gear according to claim 1, wherein the vent channel means is spaced approximately the same distance to the highest place of the interior space of the transmission housing means as the overflow channel means to the lowest place thereof so that the oil-filling is approximately the same during normal and upside-down flights.

3. A lubrication arrangement for a reduction gear according to claim 2, wherein the vent channel means is operatively connected with an oil leakage line of a hydraulic propeller governor by way of a branch line.

4. A lubrication arrangement for a reduction gear according to claim 4, wherein pipes of the same diameter are used for the vent channel means and the overflow channel means, said pipes extending into the interior space of the transmission housing means and into the crankcase means and being retained and sealed by threaded bush means.

5. A lubricating arrangement for a reduction gear according to claim 10 wherein the vent channel means is spaced approximately the same distance to the highest place of the interior space of the transmission housing means as the overflow channel means to the lowest place thereof so that the oil-filling volume is approximately the same during normal and upside-down flights.

6. A lubrication arrangement for a reduction gear according to claim 5, wherein the vent channel means is operatively connected with an oil leakage line of a hydraulic propeller governor by way of a branch line.

7. A lubrication arrangement for a reduction gear according to claim 6, wherein pipes of substantially the same diameter are used for the vent channel means and the overflow channel means, said pipes extending into the interior space of the transmission housing means and into the crankcase means and being retained and sealed by threaded bush means.

8. A lubrication arrangement for a reduction gear according to claim 1, wherein the vent channel means is operatively connected with an oil leakage line of a hydraulic propeller governor by way of a branch line.

9. A lubrication arrangement for a reduction gear according to claim 8, wherein pipes of substantially the same diameter are used for the vent channel means and the overflow channel means, said pipes extending into the interior space of the transmission housing means and into the crankcase means and being retained and sealed by threaded bush means.

10. A lubrication arrangement for a reduction gear according to claim 1, wherein pipes of substantially the same diameter are used for the vent channel means and the overflow channel means, said pipes extending into the interior space of the transmission housing means and into the crankcase means and being retained and sealed by threaded bush means.

* * * * *